April 7, 1959     A. B. HERREN     2,880,611

MEANS FOR MEASURING BULK MODULUS

Filed April 15, 1957

INVENTOR.
Alfred B. Herren
BY

United States Patent Office 2,880,611
Patented Apr. 7, 1959

2,880,611

MEANS FOR MEASURING BULK MODULUS

Alfred B. Herren, Derby, Kans., assignor to Boeing Airplane Company, Wichita, Kans., a corporation of Delaware Application April 15, 1957, Serial No. 652,749

3 Claims. (Cl. 73—53)

My invention relates to an apparatus for measuring the bulk modulus of a fluid. The apparatus is particularly adapted for making measurements in an operating system. A sample of the system fluid is isolated and pressure is cycled through a range from zero upward. The change of volume and the change of pressure are continuously recorded during the compression.

Bulk modulus is an important characteristic of a fluid in a hydraulic or other fluid system. Previous methods of measuring bulk modulus have been particularly unsatisfactory in making environmental tests in an operating system. A sample of the fluid is usually removed from the system and may change in characteristic before measurement is made. It is an object of my invention to provide apparatus which may be interposed in the actual system so that the measurement may be made in environmental conditions.

A large number of measurements may be desirable. Prior devices usually showed by each experiment only one point on the bulk modulus curve rather than the entire compressibility curve. For example, in one prior device fluid is isolated under a selected pressure and then the chamber opened and the spill-over measured. It is an object of my invention to provide an apparatus for recording substantially the entire compressibility curve at each selected temperature.

Further objectives of my invention include: to provide apparatus which may be used in various simulated environments, such as in an oven or cold box; to provide an apparatus with minimum errors due to variables; to save time of operating personnel by taking a large group of measurements in one operation and to provide means whereby the data may be automatically recorded; and to provide an economical, low maintenance and efficient apparatus while achieving the above objectives.

My invention will be best understood, together with additional objectives and advantages thereof, from a reading of the following description, read with reference to the drawings in which.

Figure 1:
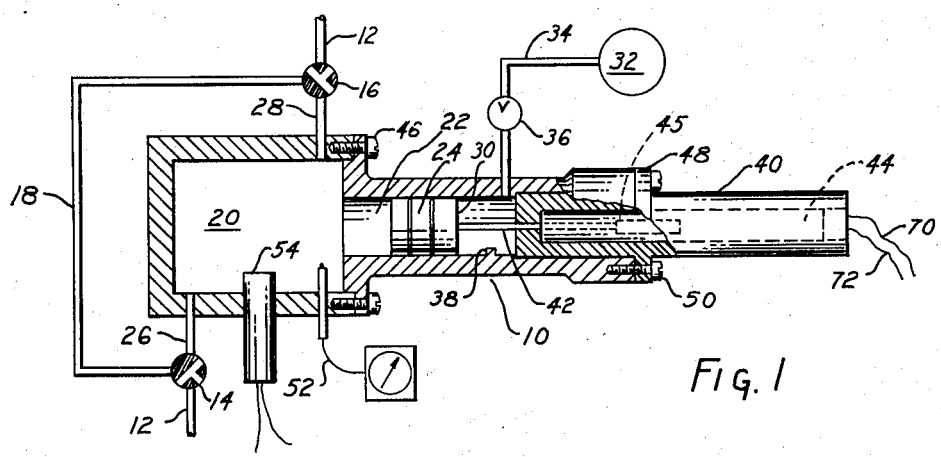
Figure 1 is a schematic view of the principal mechanical components of a specific embodiment of my system.

Referring to Figure 1, the fluid compressibility gage 10 is shown interposed in a conduit 12 of a system. Conduit 12 is broken by three-way valves 14 and 16, whereby fluid may be directed through a by-pass line 18 or through a compression chamber 20. It is desirable that the three-way valves 14, 16 be simultaneously operated. This may be accomplished by mechanical linkage or by solenoids. For the purposes of this disclosure, valves 14, 16 are described as three-way, solenoid-operated valves. Conduit 12 may be any operating line of a working system and measurements are taken without interfering with the operation of the system.

Chamber 20 provides means for isolating a fixed volume of fluid and the volume thereof, $V_0$, may be taken to include the volume of the chamber, plus the volume of cylinder 22 on the inner side of piston 24, plus the portions 26, 28 of the conduits inside of valves 14, 16.

The preferred means of applying pressure to chamber 20 is piston 24, operated by hydraulic pressure applied to its outer side 30. The source of force shown is a pressurized accumulator 32 having a line 34 connected to the outer end of cylinder 22 and having an interposed needle valve 36. If the pressure applying fluid is of the same type as that being compressed and if the piston stem is small, then leakage past the piston is not a significant factor. Friction is minimized by grooving the piston and generous tolerances. A stop 38 limits outer movement of piston 24. Conduit 34 may instead be applied through the extensometer housing 40.

Piston 24 has a stem 42 with a permeable probe 45 attached to its end. Probe 45 is received in extensometer housing 40 and acts within extensometer 44. Changes in volume $\Delta V$ are thus a function of the cross-sectional area $a_0$ of cylinder 22 times the distance $x$ through which the piston 24 is moved. Probe 45 moves the same distance $x$ and this movement is measured by extensometer 44.

The assembly of Figure 1 is not shown in detail as to fittings, seals and the like. Cylinder 22 may be flanged to form one wall of chamber 20 secured by bolts 46. Extensometer housing 40 is secured to the outer end of cylinder 22 by a flange 48 secured by bolts 50. The walls of chamber 20 should be thick to avoid appreciable error due to pressure-induced expansion. Seals for the joinder of cylinder 22 to chamber 20 preferably should be contiguous to the interior of the chamber and a metal gasket may be used to avoid compliance of entrapped air or packing material. Seating type valves may be used in the by-pass arrangement to avoid the possibility of leakage about the fittings and the valves may be installed directly on the chamber to avoid tube expansion.

The temperature of the fluid is measured by a standard type of thermocouple and temperature indicator 52. Also extending into chamber 20 is a pressure transducer 54.

Figure 2:
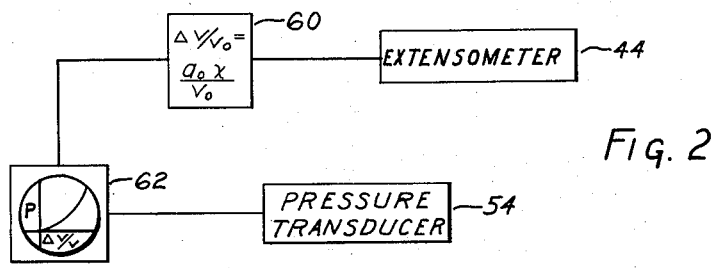
Figure 2 is a schematic view of the electrical measurement and recording components.

Figure 2 shows the main electrical components which include extensometer 44, pressure transducer 54, a data converter 60, and an answer presentation unit 62. Unit 62 may be an oscilloscope, oscillograph, x—y plotter, two-channel recorder or the like. Various devices of this type are on the market and the application in the circuit of Figure 2 will be evident. Unit 62 records simultaneous values of $$\frac{\Delta V}{V}$$

and $P_0$.

Figure 5:
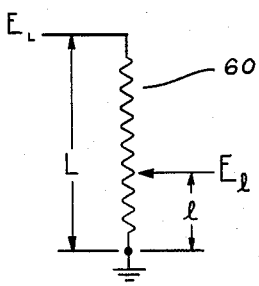
Figure 5 is a schematic view of the data converter.

Data converter 60 is shown in Figure 5. $E_L = k_1 x$.

$$E_1 = \frac{1}{L} E_L = \frac{1}{L} k_1 x$$

It is desired to have $E_1$ proportional to $$\frac{a_0}{V_0} x \text{ or } E_1 = k_2 \frac{a_0}{V_0} x$$

This will be true if $$\frac{1}{L} = \frac{k_2}{k_1} \frac{a_0}{V_0}$$

Figure 3:
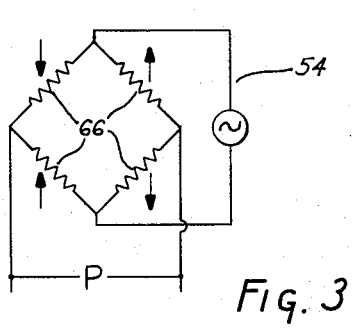
Figure 3 is a schematic diagram of the pressure transducer.

Figure 3 shows a circuit, providing a low-compliance pressure transducer, which is a bridge having a series of resistances 66, such as strain gages, which are deformed responsive to pressures in chamber 20 and produce values P proportional to changes in pressures. Strain-sensitive resistance wires diametrically opposed across the bridge are subjected to the same strains, i.e., the upwardly-directed arrows indicate tension and the downwardly directed arrows indicate compression. Thus, when a pressure deforms the compliant portion of the transducer, a bridge unbalance results and generates a voltage P which is proportional to the applied pressure. A low-compliance transducer is preferred and various types of pressure responsive devices may be used of the types found on the market.

Figure 4:
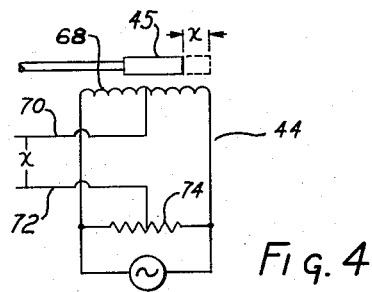
Figure 4 is a schematic view of the extensometer.

Figure 4 shows a bridge having an inductance 68 across which magnetically permeable probe 45 moves in distances $x$. This movement $x$ is reflected across leads 70, 72, which are respectively connected to medial portions of inductance 68 and resistance 74. The extensometer 44 may be the type shown in the circuit or may be a differential transformer or other variable permeable transducer type available on the market.

*Operation*

At a given system temperature, which may be produced by ambient temperatures, an oven, or a cold box, a sample of system fluid is isolated by operating solenoid valves 12, 14 which seal off chamber 20 and provide a by-pass flow around the chamber. Immediately the variable supply pressure from accumulator 32 is cycled through its range from zero upward. This causes piston 24 to execute a compressive stroke into the chamber $V_0$, which is resisted by the stiffness of the air-oil aggregate in the chamber. Since $$\frac{\Delta V}{V} = \frac{\Delta V}{V_0} = \frac{a_0 x}{V_0}$$

the plot relating $P_0$ to $$\frac{\Delta V}{V}$$

in the chamber is easily obtained from knowledge from $V_0$, $a_0$ and a simultaneous plot of $x$ and $P_0$. The $P_0$ versus $x$ curve can be displayed on an oscilloscope and photographed or it can be traced with an $x$—$y$ plotter. The bulk modulus curve is derived from the plot from the defining relation $$B = \frac{P}{\Delta V/V}$$

or $$B^* = \frac{\Delta P}{\Delta\left(\frac{\Delta V}{V}\right)}$$

If desired, the final curve of $$P \text{ versus } \frac{\Delta V}{V}$$

can be directly traced or displayed on a scope. This can be done according to the above relationships between $x$, $P_0$, $a_0$, and $V_0$.

By the method and means disclosed, a test sample is isolated and subjected to rapidly varying pressure and volume changes. The functional relationship between changing pressure and unit change of volume is recorded or displayed. Due to the rapid action, measurement can be made of liquids containing entrained or dissolved gas. This measurement in a working system can be more significant than the measurement of the pure liquid. Although the apparatus is particularly advantageous in such environment, it will be evident that a sample can be introduced to the chamber for single tests independent of operating systems. Other means of applying pressure can be substituted. The speed of the ram piston should not exceed the capability of the recording unit to accurately record the changing pressures and volumes. Elastic hysteresis also can be investigated with the apparatus.

Having thus described my invention, I do not wish to be understood as limiting myself to the precise details of construction shown, but instead wish to cover those modifications thereof which will occur to those skilled in the art from my disclosure and which fairly fall within the scope of my invention, as described in the following claims.

I claim:

1. Means for measuring the bulk modulus of a material flowing in a conduit, comprising: a chamber interposed in said conduit, a bypass line connecting said conduit around said chamber and three-way valves at the ends of said bypass line operable by the operator to instantaneously segregate the material in the chamber at the time of operation and to direct continuing, uninterrupted flow of material in said conduit through said bypass line, temperature measuring means for said chamber, a cylinder communicating with said chamber and a piston in said cylinder whereby pressure applied to said chamber and volume of material in said chamber and cylinder may be continuously varied throughout the stroke of said piston, operator controlled means operable to apply force to move said piston, an electrical extensometer connected to said piston and operable to measure movement thereof in continuous values, an electrical pressure transducer connected to said chamber operative to measure the pressure thereof in continuous values, and electrical registering means connected to said extensometer and said transducer operative continuously to register the simultaneous changing volume and pressure values from said extensometer and transducer whereby a compressibility curve can be obtained from a single stroke of said piston.

2. Means for measuring the bulk modulus of a material flowing in a conduit, comprising: a chamber interposed in said conduit, a bypass line connecting said conduit around said chamber and valve means at the ends of said bypass line operable by the operator to instantaneously segregate the material in the chamber at the time of operation and to direct continuing, uninterrupted flow of material in said conduit through said bypass line, said chamber having piston means acting to continuously vary the pressure and volume thereof upon a stroke of the piston, operator controlled means operable to apply force to move said piston, first electrical means operative to measure changes in chamber volume in continuous values, second electrical means operative to measure changes in chamber pressure in continuous values, and electrical registering means connected to said first and second electrical means operative continuously to register the simultaneous changing volume and pressure values whereby a compressibility curve can be obtained from a single stroke of said piston.

3. Means for measuring the bulk modulus of a material flowing in a conduit, comprising: a chamber connected to said conduit, valve means operable by the operator to instantaneously segregate the material in the chamber at the time of operation, a cylinder communicating with said chamber and a piston in said cylinder whereby pressure applied to said chamber and volume of material in said chamber and cylinder may be continuously varied throughout the stroke of said piston, operator controlled means operable to apply force to move said piston, an electrical extensometer connected to said piston and operable to measure movement thereof in continuous values, an electrical pressure transducer connected to said chamber operative to measure the pressure thereof in continuous values, and electrical registering means connected to said extensometer and said transducer operative continuously to register the simultaneous changing volume and pressure values from said extensometer and transducer whereby a compressibility curve can be obtained from a single stroke of said piston.

References Cited in the file of this patent

UNITED STATES PATENTS

| | | |
|---|---|---|
| 2,380,082 | Sloan | July 10, 1945 |
| 2,662,393 | Rzasa | Dec. 15, 1953 |
| 2,721,109 | Ross | Oct. 18, 1955 |
| 2,827,705 | Elliott et al. | Mar. 25, 1958 |